Dec. 1, 1936.  N. L. ALISON  2,062,281
HYDRAULIC COUPLING
Filed March 18, 1935   3 Sheets-Sheet 1

INVENTOR
NOAH L. ALISON.
BY
ATTORNEYS

Dec. 1, 1936.  N. L. ALISON  2,062,281
HYDRAULIC COUPLING
Filed March 18, 1935  3 Sheets-Sheet 2

INVENTOR
NOAH L. ALISON.
BY
ATTORNEYS

Dec. 1, 1936.  N. L. ALISON  2,062,281
HYDRAULIC COUPLING
Filed March 18, 1935   3 Sheets-Sheet 3

INVENTOR
NOAH L. ALISON.
BY
ATTORNEYS

Patented Dec. 1, 1936

2,062,281

UNITED STATES PATENT OFFICE 2,062,281

HYDRAULIC COUPLING

Noah L. Alison, Detroit, Mich., assignor to American Blower Corporation, Detroit, Mich., a corporation of Delaware Application March 18, 1935, Serial No. 11,551

10 Claims. (Cl. 60—54)

My invention relates to hydraulic couplings.

It is my object to provide a self-pumping hydraulic coupling.

It is an object to provide a coupling in which the rotation of the coupling itself serves to cause the fluid to flow to and from the coupling; and, by adjusting the flow to and from the coupling, the operation thereof can be controlled and the relationship between the driving and driven member regulated.

It is a further object to provide a self-contained coupling, in which all moving parts are enclosed and in which the housing for the coupling serves the multiple purpose of a guide and pumping chamber, a reservoir for the fluid in the coupling, and for enclosing the rotative parts of the coupling.

It is my object to eliminate pumps, scoops, delivery tubes in the coupling, and core rings for handling fluid in the coupling.

It is my object to use the movement of the coupling itself for causing the flow of fluid through the coupling so that, by regulating the quantity of fluid so flowing, the relationship between the driving and driven member may be controlled.

Heretofore, couplings of this character have been unenclosed so that they must have some special form of protection to prevent injury to the operator, such as the use of a wire screen, or the like. It has also been necessary to have special reservoirs, pumps and similar mechanism. It has been necessary to have scoops for controlling the liquid flow extending into the interior of the coupling.

Referring to the drawings.

Figure 1:
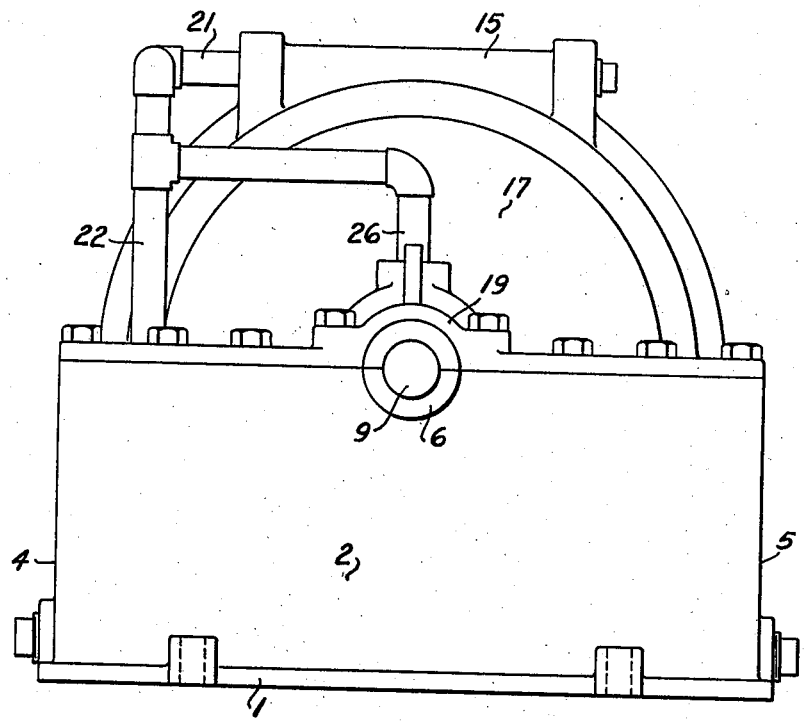
Figure 1 is a side elevation of the coupling.
Figure 2:
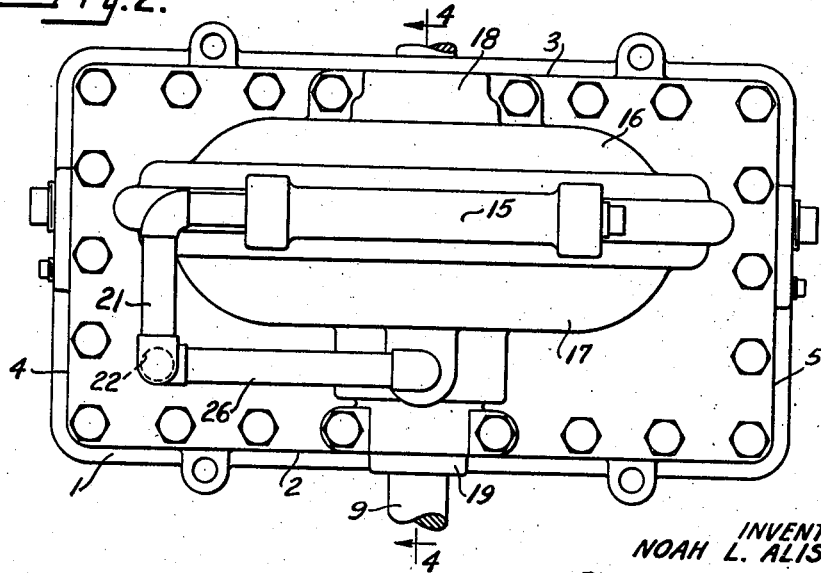
Figure 2 is a top plan view.

Referring to the drawings in detail, 1 is the base of a housing that constitutes the enclosure for the rotating parts of the coupling, and also acts as a reservoir for the liquid received from the coupling and returned to the coupling. The lower half of this casing consists of the base 1 and the side walls 2, 3, 4 and 5. The upper margins of the walls 2 and 3 provide bearings 6 and 7 for the respective shafts 9 and 8.

The lower half of the base is provided with a semi-circular chamber having the side walls 10 and 11 which merge to form a semi-annular channel 12 for reception of the fluid-actuating blade 13 acting as a pumping plate. This channel is continued as a circular channel by the semi-circular channel 14 in the cover 15 which has the semi-circular side walls 16 and 17 in continuation of the walls 11 and 10 of the base. Thus, a complete annular enclosure is provided for the rotating parts of the coupling. The shafts of the coupling are retained in position by the upper halves of the bearings designated 18 and 19 which cooperate with the lower halves 7 and 6. The lower portion of the casing for the rotating parts, which is located within the base, forms with the walls of the base a fluid reservoir designated 20. This reservoir is in communication with a piping system which conveys fluid from and to the coupling. The pipe 21 removes fluid from the upper portion of the casing tangentially of the channel 14. The fluid so removed is conveyed in one of three ways. The first way it may be conveyed is downwardly through the pipe 22 to the valve member 23 which may either discharge it through the port 24 into the reservoir 20 or discharge it through the pipe 25 to the bottom of the annular chamber designated 12 where it is delivered tangentially of the rotating plate 13 and the rotating parts of the coupling.

The delivery to the coupling as above described is the second direction of delivery.

The third direction of delivery is to return the fluid through the pipe 26 into the passageway 27 and thence through the port 28 into the interior of the coupling between the respective halves 29 and 30 of the coupling. These halves of the coupling are free to move with respect to one another as they are mounted on the respective shafts 9 and 8. They are spaced from one another to form interior passageways 31 and exterior passageways 32. The fluid from the passageway 27 may pass through the passageway 31 into the interior of the coupling.

The respective halves 29 and 30 of the coupling are provided with a plurality of radial vanes 33 and 34. A circular rib, semi-circular in section, is mounted on the exterior faces of these vanes as at 35 and 36. But, when desired, a rib or dam 37 may be provided on the face of the coupling half 29 to regulate the flow of liquid between the vanes, which dam serves to offer a relatively slight obstruction to normal circulation of the liquid but to impede the circulation of a shallow high velocity liquid vortex.

The coupling half 30 is provided with a companion member 38 which encloses but is spaced from the coupling half 29. This half is provided with a port 39 through which the liquid passes from the passageway 32 and thence into the annular passageway 12, 14. Between the half 30 and member 38 is embraced the fluid-actuating disk 13 which extends into the annual chamber formed by the channel halves 12 and 14. The bolts 13a retain the members 30, 38, and 13 together. The inner margin of the coupling member 38 has a bearing sleeve 40 engaging with the bearing sleeve 41 of the coupling half 29.

The coupling half 30 is provided with a sleeve 30a for the mounting of it upon the shaft 8. The sleeve 30a is provided with an oil-obstructing ring 30b so that any surplus oil may be discharged into the collecting chamber 42 and thus returned by the ports 43 into the space 44 between the casing for the rotating parts and the rotating parts, whence the leakage returns directly into the system. This arrangement eliminates the necessity for castings for the rotating parts that are impervious to the passage of fluid because any slight leakage through them returns immediately to the system and is so immaterial as not to affect the operation of the coupling. By the arrangement of my invention, I am, therefore, able to do away with one of the problems in hydraulic couplings of leakage and the effect upon the mechanism.

The shaft 9 has an oil-obstructing ring 9a which likewise discharges into a collecting chamber 46 that communicates through the port 47 with the space 44.

Operation

The purpose of a coupling of this character is to regulate the relation between the driving and driven members. Assuming that the shaft 8 is a driving shaft and assuming the direction of rotation is that indicated by the arrows on the drawings, the relative movement between the shafts 8 and 9 and their respective parts will be determined by the quantity of fluid in the coupling and the regulation of the flow of the fluid to and from the coupling.

Assuming the three-way valve 23 is adjusted to close off the pipe 22, then the fluid-actuating disk 13 will discharge the fluid from the annular channel 12 and 14 which has been delivered thereto through the passageways 39 by centrifugal force. This discharge will take place through the pipe 21 thence through the passageway 27 and thence into the coupling through the passageways 28 and 31.

If the valve 23 is set as shown in the drawings, then the liquid from the pipe 22 will discharge into the reservoir 20 and the coupling will be drained of its fluid. If the valve 23 is set to cut off the pipe 22 and to put the reservoir 20 in communication with the pipe 25, then the fluid will be drawn from the reservoir by the action of the disk 13 and the rotating half 30 and member 38.

This self-contained coupling uses its rotating parts for discharging the fluid from the coupling and returning the fluid to the coupling without any special outside pumping mechanism.

The rate of flow will be in proportion to the speed of rotation. The disk 13 may be of any desired form and the exterior of the members 30 and 38 may be of any desired form so long as this discharge and pumping action takes place. The rotating parts are completely enclosed and, therefore, present no danger to the operator. The mechanism provides a unitary structure which may be supplied as a separate piece of merchandise that can be attached to the driving and driven mechanism.

When the coupling is filled with liquid and the liquid is passing in a rotative path as indicated by the arrows between the vanes 34 and 33 from the driving and driven member, the driving and driven members will turn substantially together as a unit and, as this full condition is departed from, the relationship between the driving and driven members is accordingly modified. The speed of the driving member, of course, regulates the extent of the pump action, both by reason of the centrifugal delivery of the fluid and the action of the liquid discharge means, such as the disk 13.

Figure 6:
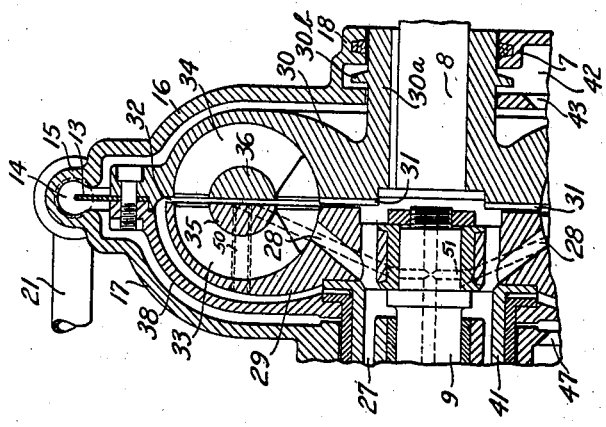
Figure 6 is a section similar to Figure 4 showing a modified form of shape of the interior of the coupling.
Figure 5:
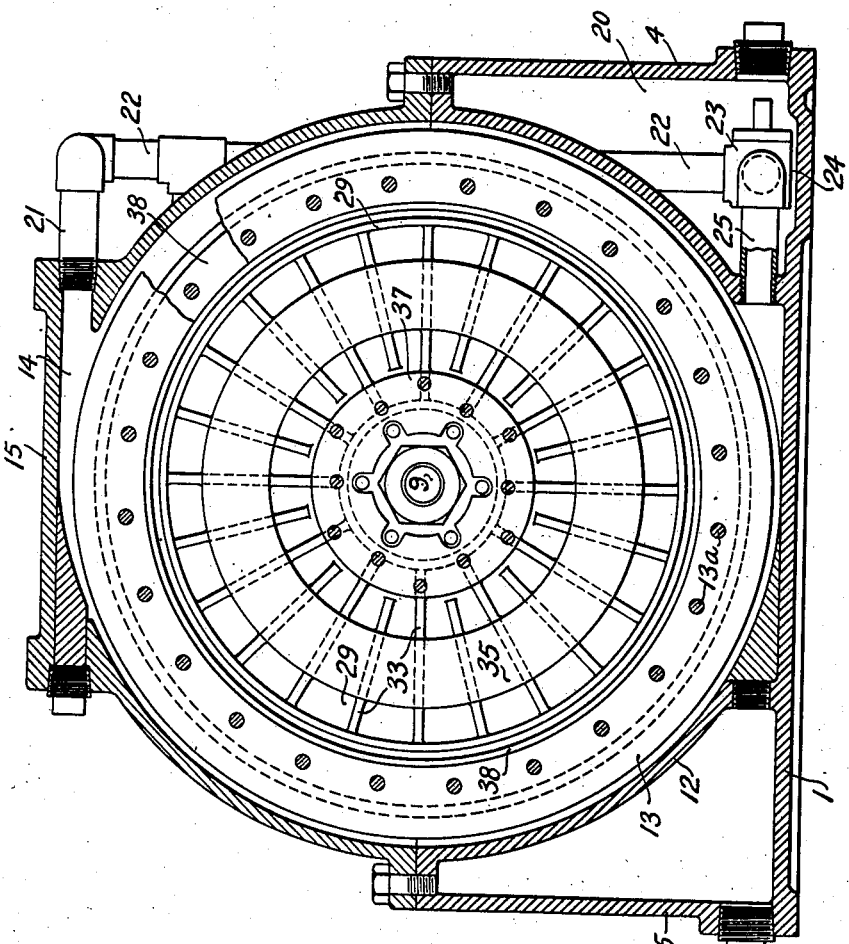
Figure 5 is a side elevation with the casing in section and one-half of the coupling removed looking in the direction of the arrows on the line 5—5 of Figure 4.

Referring to the modified form shown in Figure 6, the dam or barrier 37 may be eliminated and the interior cross section of the members 30 and 29 modified. The modification of the interior cross-section may be such as to accomplish substantially the same purpose of the barrier 37. This accomplishes the result of regulating the rotative movement of the fluid from half of the coupling to the other at certain speeds. In order to understand the operation and regulation of this coupling, it is necessary to have a thorough understanding of the various functions of valve 23. This valve is what is commonly known as a 2-way valve, that is, it operates in two different positions and each position produces a certain result. The inner cylinder of the valve which rotates about an axis through its center, contains a cored passage through the cylinder at right angles to its axis. The different positions of this cored passage through the cylinder as accomplished by rotating the cylinder on its axis, determines which one of its two functions this valve will perform as follows:

(a) The cylinder rotated until the cored opening is in a horizontal position, connects reservoir 20 through pipe 25 into annular chamber 12. This position fills the coupling with oil, which is accomplished by the passing of oil through passages 14, 21, 26, 27, and 28, and is used for increasing the speed.

(b) By revolving this valve cylinder through 90 degrees until the cored opening is in a vertical position, the valve then connects pipe 22 into reservoir chamber 20. This position of the valve is used to remove oil from the working circuit of the coupling and deposit it in reservoir 20.

The purpose of a coupling of this character is to control the relation of speed between the driving and driven members and this relation in speed is controlled by the amount of oil in the working circuit of the coupling.

Figures 3, 4:
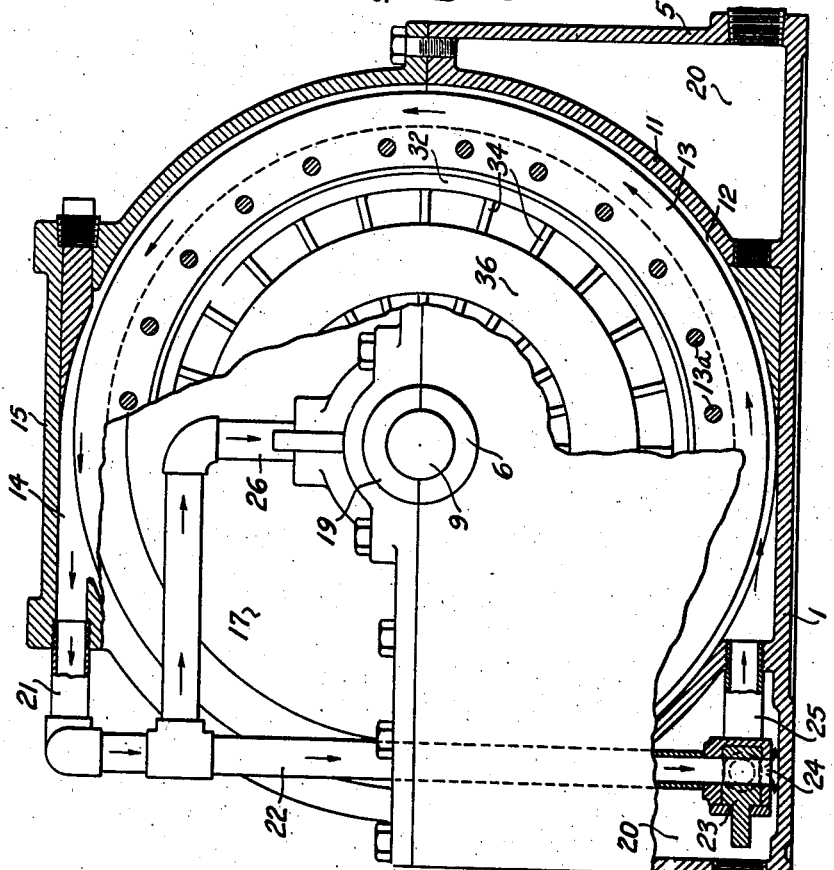
Figure 3 is a side elevation partially in section.
Figure 4 is a section on the line 4—4 of Figure 2.

Assume the driving member 30 operating at a constant speed, and the driven member 29 stationary with no oil in the working circuit of the coupling but with reservoir 20 filled with oil and valve 23 in position shown in Figure 4.

Now rotate valve 3 so that the cored opening is in horizontal position (b) and oil will enter through pipe 25 into chamber 12 and be rotated by disc 13 and discharged through pipes 21 and 26, and passages 27, 28 and 31 into the working circuit. As soon as oil begins to enter the working circuit, the driven member 29 will begin to rotate and accelerate as long as valve 23 is in this position until the desired speed relation between the driving member 30 and the driven member 28 is obtained. At this point valve 3 is closed, and this speed relation will be maintained until a change in speed is desired.

If it is desired to increase or decrease the speed of the driven half this can be accomplished by simply placing valve in either position (b) or position (a) as above described and holding it there until the desired speed change has been accomplished and then closing the valve.

The horizontal cored openings 50 shown by dotted lines, Figs. 4 and 6, in the driven member 29 are for the purpose of equalizing the pressure existing in the space between members 29 and 38 with the pressure existing in the center of the working circuit members 29 and 30. This is for the purpose of eliminating thrust between the driving and driven members. The passage 51 shown in dotted lines in Figs. 4 and 6 leading from the center of the semi-circular rib 35 to the center of the driven shaft 9, is for the purpose of allowing the air to flow out of or into the working circuit as oil is added to or taken from this circuit.

It will be understood that this coupling can rotate in either direction. The particular shape and form of the casing, of the coupling parts, of the fluid-moving disk 13, and the relationship of the reservoir may be modified without departing from my invention. The arrangement of piping, the arrangement of valves, and other details of construction may be adjusted to suit the convenience of the user of my invention.

It will be understood that I desire to comprehend within my invention such modifications as may be necessary to adapt it to varying conditions and uses.

Having thus fully described my invention, what I claim as new and desire to secure by Letters Patent, is:

1. In a hydraulic coupling apparatus, the combination of a casing having an annular restricted pumping chamber with an outlet therefrom and a main chamber, a hydraulic coupling rotatable in the main chamber, said coupling having a peripheral outlet, and a pumping means peripherally mounted on said coupling and extending from the main chamber into the pumping chamber.

2. In a hydraulic coupling apparatus, the combination of a casing having an annular restricted pumping chamber with an outlet therefrom and a main chamber, a hydraulic coupling rotatable in the main chamber, said coupling having a peripheral outlet, a pumping means peripherally mounted on said coupling and extending from the main chamber into the pumping chamber, and means for returning the fluid discharged from the periphery of the coupling into the pumping chamber from the pumping chamber to the interior of the coupling centrally thereof.

3. In a hydraulic coupling apparatus, the combination of a casing having an annular restricted pumping chamber with an outlet therefrom and a main chamber, a hydraulic coupling rotatable in the main chamber, said coupling having a peripheral outlet, a pumping means peripherally mounted on said coupling and extending from the main chamber into the pumping chamber, and means for returning the fluid discharged from the periphery of the coupling into the pumping chamber from the pumping chamber to the interior of the coupling centrally thereof comprising an unrestricted passageway.

4. In a hydraulic coupling apparatus, the combination of a casing having an annular restricted pumping chamber with an outlet therefrom and a main chamber, a hydraulic coupling rotatable in the main chamber, said coupling having a peripheral outlet, a pumping means peripherally mounted on said coupling and extending from the main chamber into the pumping chamber, means for returning the fluid discharged from the periphery of the coupling into the pumping chamber from the pumping chamber to the interior of the coupling centrally thereof comprising an unrestricted passageway, a tank enclosing the casing at least partially, means for conveying the fluid from the pumping chamber optionally to said tank, means for conveying the fluid from the tank back to the casing, and valve means for controlling the direction of the fluid.

5. In combination, in a hydraulic coupling apparatus, of a casing, a groove therein, a coupling rotatably mounted within said casing, a plate mounted on the periphery of said coupling extending into said groove to pump fluid from the coupling, and means in the periphery of the coupling for discharging fluid adjacent said plate.

6. In a hydraulic coupling apparatus, the combination of a casing having an annular pumping chamber, a hydraulic coupling rotatably mounted in said casing, a plate on the exterior of said coupling, said plate extending into said pumping chamber, and a permanently open pipe connecting the pumping chamber adjacent the periphery of the coupling to the interior of the coupling adjacent the center of the coupling.

7. In combination in a hydraulic coupling apparatus, of a casing having an annular pumping chamber, a hydraulic coupling rotatably mounted in said casing, a plate on the exterior of said coupling, said plate extending into said pumping chamber, said coupling having a permanently open means in the periphery thereof for the exit of fluid therefrom into the pumping chamber, and means for conveying by a permanently open unrestricted passageway fluid from the periphery of the pumping chamber back to the center of the interior of the coupling.

8. In combination, a casing, a hydraulic coupling mounted in said casing, a storage tank, means to deliver fluid direct from the storage tank to said casing, means to remove fluid from the casing and deliver it either direct to the tank or to the center and interior of the coupling, and valve means for controlling the direction in which the fluid is directed.

9. In a hydraulic coupling apparatus, a storage tank, a casing at least partially therein, a hydraulic coupling rotatable within said casing having means for the peripheral delivery of fluid from the coupling into the casing, means of removing by an unrestricted passageway fluid from the casing back to the center and interior of the coupling, means to deliver said fluid alternatively to the storage tank and from the storage tank to the casing, and a multiple positioned valve adapted to control the movement of the fluid.

10. In a hydraulic coupling apparatus, the combination of a casing having a separate annular pumping chamber with an outlet therefrom, a main chamber connected by means of an annular restricted opening into the said pumping chamber, a hydraulic coupling rotatable in the main chamber, said coupling having peripheral outlet and a pumping means peripherally mounted on said coupling and extending from the main chamber, through the restricted opening and into the pumping chamber.

NOAH L. ALISON.